United States Patent [19]

Doin et al.

[11] 3,917,031

[45] Nov. 4, 1975

[54] NOVEL PYROTECHNIC TENSIONING DEVICE FOR USE WITH SAFETY BELTS

[75] Inventors: Bernard J. Doin; Bernard E. Plantif, both of St. Medard en Jalles; Jean F. Tillac, Bordeaux Cauderan, all of France

[73] Assignee: Societe Nationale des Poudres et Explosifs, Paris, France

[22] Filed: July 22, 1974

[21] Appl. No.: 490,382

[30] Foreign Application Priority Data

Aug. 3, 1973 France .............................. 73.28506

[52] U.S. Cl. ............. 188/1 C; 280/150 SB; 297/386
[51] Int. Cl.² .......................................... F16F 7/12
[58] Field of Search ....... 188/1 B, 1 C; 280/150 AB, 280/150 SB; 297/386, 388; 74/492

[56] References Cited
UNITED STATES PATENTS

| | | | |
|---|---|---|---|
| 3,392,599 | 7/1968 | White | 188/1 C X |
| 3,538,785 | 11/1970 | Grancon | 188/1 C X |
| 3,696,891 | 10/1972 | Poe | 188/1 C |
| 3,837,671 | 9/1974 | Hamilton | 280/150 AB |

*Primary Examiner*—Duane A. Reger
*Attorney, Agent, or Firm*—Bucknam and Archer

[57] ABSTRACT

A pyrotechnic tensioning device for a safety belt, comprising a piston slidably mounted in a cylinder, a piston rod projecting from one end of the cylinder, and a pyrotechnic charge for forcing the piston forwards along the cylinder to retract the piston rod and tension the safety belt, also includes damping means for damping movement of the piston in the reverse direction through the cylinder under the action of the tension in the safety belt. The damping means comprises elements, such as balls, located between the piston and cylinder and which cooperate with a conical surface to jam between the piston and cylinder during said reverse movement, whereby controlled damping is effected by the elements deforming or biting into the cylinder by a predetermined amount. A tube or ring may surround the cylinder with similar elements located therebetween, such that a similar damping effect is achieved when the cylinder is pulled out of the tube or ring. The device may include means for limiting the tension applied to the belt, comprising an ejectable member normally blocking passage of combustion gases from one side of the piston to the other, the member being retained in position by an element designed to fracture at a particular pressure.

17 Claims, 7 Drawing Figures

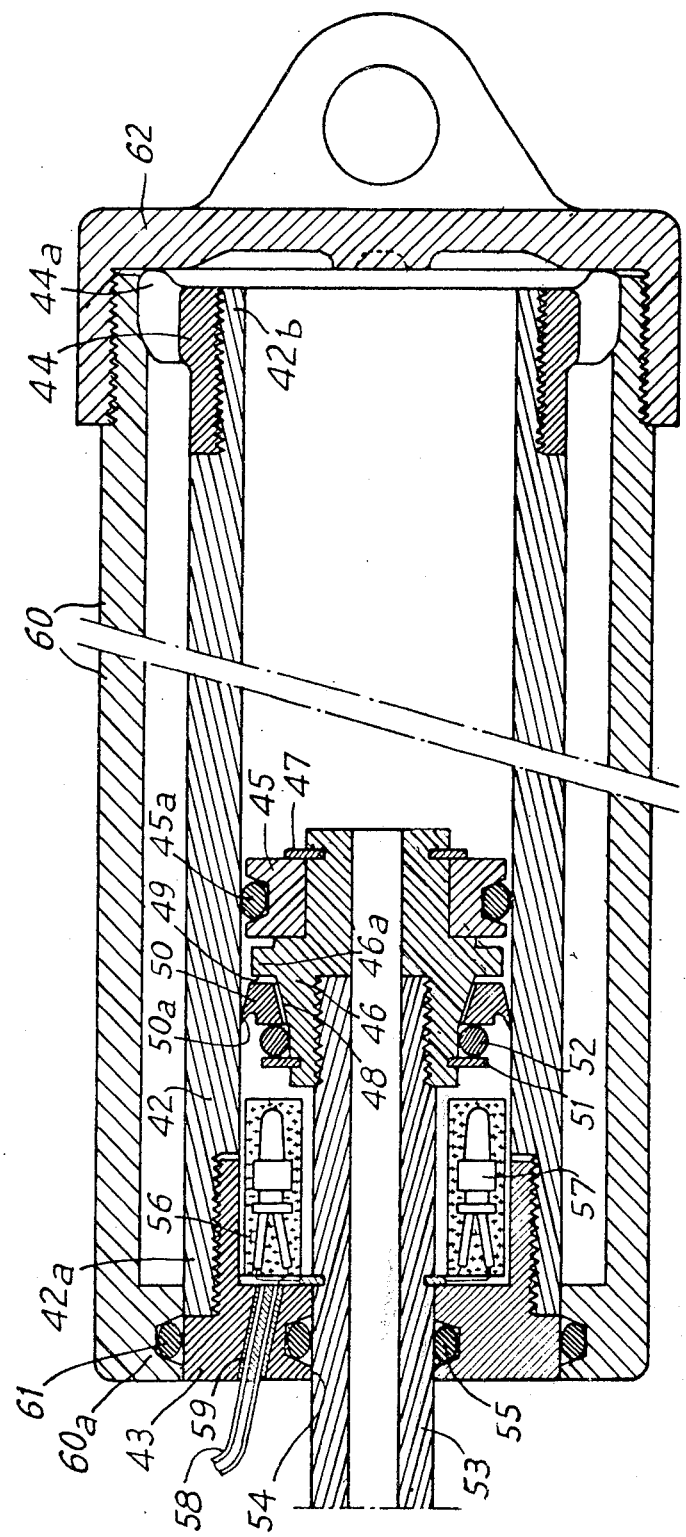

NOVEL PYROTECHNIC TENSIONING DEVICE FOR USE WITH SAFETY BELTS

This invention relates to a pyrotechnic tensioning device for use with safety belts installed in high-speed vehicles, such as automobiles.

Numerous protection devices are already known for safeguarding people travelling in high-speed vehicles. The safety belt in itself does not constitute an effective protective system, firstly because of the absence of a considerable damping effect and secondly because of the poor initial adjustment of the belt.

In order to overcome the first disadvantage, solutions have already been proposed which permit slight discontinuous damping, for example by providing folds on the belt, the fastenings of the folds breaking under the pressure exerted by the body of the person to be protected and thus allowing the belt to open out. Damping devices are also known which permit limited movement of the seat on which the passenger is sitting, it being possible for such a device to consist, for example, of a combination of rails and hydraulic jacks.

In order to overcome the second disadvantage, devices known by the name of "restraining jack" make it possible to bring the safety belt into contact with the person to be protected, at the instant of the collision, and to do so no matter what the initial adjustment of the belt may be.

In accordance with the present invention there is provided a pyrotechnic tensioning device for a safety belt, comprising damping means consisting of a first cylindrical part, a second part axially slidable within the first part, an annular groove in the surface of one of the parts, which surface faces the other part, the bottom of the groove having a conical bearing surface ending in a path limiting stop constituted by a side wall of the groove, and a circular row of elements located within the groove and having a radial dimension greater, by a predetermined amount, than the depth of the bottom of the groove adjacent the path limiting stop, whereby, in use, movement of the one part relative to the other part, in one direction of relative movement, is damped in a controlled manner by the elements deforming or penetrating the surface of the said other part.

With this device it is possible to provide two successive safety functions, firstly the function of bringing the safety belt into contact with the person to be protected only at the instant of the collision, and thereafter, the function of exerting a damping effect on the person to be protected by dissipating a large portion of his kinetic energy. The device may constitute a single and bifunctional connection component to be located between the safety belt and a fixed element of the chassis of the passenger compartment of the vehicle. In the case of people situated in the front of an automobile, for example, the device can be situated between the two seats and can form one of the three points of attachment of the safety strap.

Some devices embodying the invention are described below by way of example with reference to the accompanying drawings in which:

FIG. 5 shows a longitudinal cross-section through a variant of the tensioning device of FIG. 3;

Figure 1:
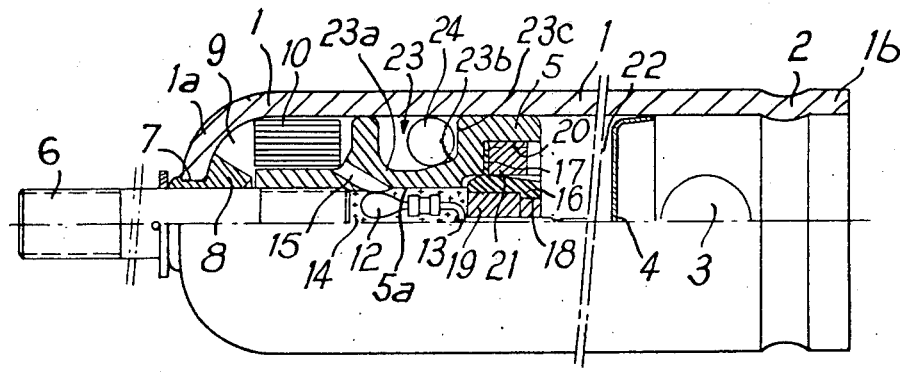
FIG. 1 is a view partly in cross-section of a first embodiment of the safety belt tensioning device.

The safety belt tensioning device shown in FIG. 1 comprises a cylindrical tubular component 1, closed at one of its ends by a rounded base 1a and open at the other end 1b, this end including a radially reduced portion 2 and decompression ports 3. An anti-dust gasket 4 is disposed inwardly of the ports 3.

Inside the component 1, a piston 5 with a double bearing surface is mounted so as to be axially slidable, the piston having a central bore and being secured on the end of a rod 6. The rod passes through an axial orifice 7 in the base 1a, with a seal 8 located between the base and rod.

A combustion chamber 9 is provided between the piston 5 and the base 1a and inside this combustion chamber there is positioned an annular, gas-generating pyrotechnic charge 10 consisting, for example, of 2 g of solvent-free homogeneous powder with a high potential, based on nitrocellulose and nitroglycerine containing various additives, such as a plasticiser and a combustion regulator.

Ignition of this charge is effected by means of two micro-ignition devices 11 and 12 located within the bore 5a of the piston 5 and connected by conducting wires 13, extending through the anti-dust gasket 4 and a port 3, to a firing control device employing electric pulses, such as an impact detector. The micro-ignition devices trigger an ignition charge 14 also positioned in the bore of the piston and consisting, for example, of 0.5 g of a powder with a high rate of combustion, based on copper oxide $CuO$ (63 percent) and zirconium (37 percent).

The bore 5a of the piston and the combustion chamber 9 are kept in communication via side channels 15.

A device for limiting the tensile force exerted by the rod 6 comprises a biconical ejectable plug 16 equipped with a small annular lateral flange 17 and an axial passage 18 through which the conducting wires 13 can pass, with a seal 19 positioned therebetween. This plug seals the free end of the bore 5a of the piston and is held in position by clamping the small flange 17 between the bottom of a cylindrical seat 20 and an annular screw 21 in threaded engagement with a topped wall of seat 20.

The tensile force exerted by the rod is limited by the small flange 17 breaking as soon as this force exceeds a predetermined value, for example 750 kgf, and by the plug 16 being ejected. This brings the combustion chamber into communication with the portion 22 of the cylinder situated in front of the piston via the bore of the piston.

The controlled damping device comprises a circumferential groove 23 in the side wall of the piston, the bottom wall of the groove comprises a cylindrical part 23a extended at the front by a conical bearing surface 23b ending in a path limiting stop 23c constituted by a side wall of the groove.

A circular row of balls 24 is disposed in the groove 23, the diameter of the balls being slightly less than the distance between the bottom of the groove, at the cylindrical part, to the internal surface of the tubular component, and slightly greater than the distance between the bottom of the groove at the end of the conical bearing surface adjacent the path limiting stop, and the inner surface of the tubular component.

The balls may be made of very strong nickel-chrome steel, while the internal wall of the tubular component is made of a material which is less hard and can be deformed more easily, for example duralumin.

In use, the free end of the piston rod 6 is firmly connected to the attachment buckle of a safety belt and the cylindrical component 1 is fixed by means of the reduced portion 2 and an attachment device to the floor of the passenger compartment of the vehicle. When a collision takes place, an impact detector emits an electric pulse for firing the micro-ignition devices 12 which ignite the pyrotechnic charge 10. During a first phase of operation, under the effect of the pressure of the gases produced by combustion of this charge, for example a thrust of approximately 300 kgf in the combustion chamber, the piston 5 is propelled forwards through the cylinder 1, carrying the rod 6 with it as it travels. The rod in turn exerts a pulling force on the safety belt and tensions it in order to bring it into contact with the passenger to be protected.

While the belt remains loose, the pressure in the combustion chamber remains substantially constant during the movement of the rod relative to the cylinder. As soon as the belt is brought into contact with the passenger to be protected, the resistance to piston movement increases and the pressure inside the combustion chamber increases gradually until the small flange 17 breaks leading to ejection of the plug 16. The tensile force exerted by the rod on the safety belt is, for example, fixed at 750 kgf, corresponding to an interior limiting pressure of 190 bars, in order to avoid causing discomfort to the passenger. When the limiting force is reached and the small flange 17 breaks, the combustion gases enter the front portion 22 of the cylinder via the channels 15 and the bore 5a, force the anti-dust gasket 4 back to the necked-in portion 2 and are discharged into the atmosphere through the decompression ports 3.

The second phase of operation begins as soon as the plug 16 is ejected. The ejection of the plug 16 immediately stops the forward movement of the rod 6 which is still acted upon by the tensile force exerted at its free end by the safety belt, and tends to recoil. This recoil first causes the balls 24 to become jammed between the conical bearing surface 23b and the internal wall of the cylinder 1, and then causes the balls to penetrate or outwardly deform the material of which this internal wall is made, until the balls engage the path limiting stop 23c.

When the force exerted by the passenger on the belt exceeds a predetermined value, for example between 450 and 650 kgf, the rod and the piston are pulled gradually backwards while the balls exert a braking effect opposing this movement by deforming and rolling out grooves in the internal wall of the cylinder 1. A damping effect with a constant resistance is produced on the passenger to be protected, due to dissipation of a large portion of his kinetic energy, because the return movement of the piston rod 1 is accompanied by controlled permanent deformation of the material of which the internal wall of the cylinder 1 is made.

The value of the damping effect is determined by the number of balls used and by the depth to which these balls penetrate into the wall of the cylinder. For example, if each ball forms a depression of 2/10 mm, with nickel-chrome steel balls of diameter 6 mm and with a cylinder made of duralumin, there must be nine balls to produce a return force of 650 kgf.

Figure 2:
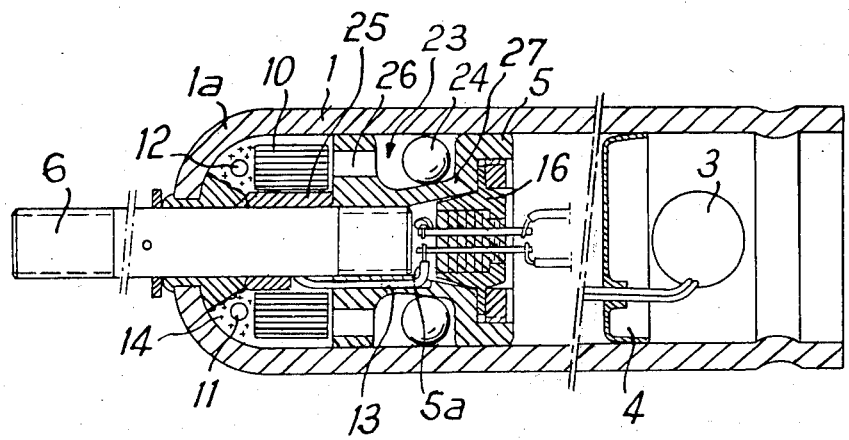
FIG. 2 is a view in cross-section of a variant of the tensioning device of FIG. 1.

According to the modified device represented in FIG. 2 of the drawing, the firing device comprises the ignition devices 11 and 12. The firing charge 14, instead of being located in the bore of the piston, is placed around the rod 6, in the combustion chamber 9, between the pyrotechnic charge 10 and the rounded base 1a of the cylinder 1. The conducting wires 13 connect the ignition devices 12 to a firing control device, and extend through a channel pierced in the piston and then through the axial bore of the piston, the plug 16, the anti-dust gasket 4 and a port 3. A spirally split ring 25 is also provided to wedge the conducting wires and the pyrotechnic charge.

In use, the combustion gases pass through channels 26 provided in the rear part of the piston parallel to the axis of the latter and then through groove 23 and side channels 27 which are provided at the level of the conical bearing surface 23b and connect the groove to the bore 5a of the piston. The side channels open opposite the rear cone of the plug 16.

Figure 3:
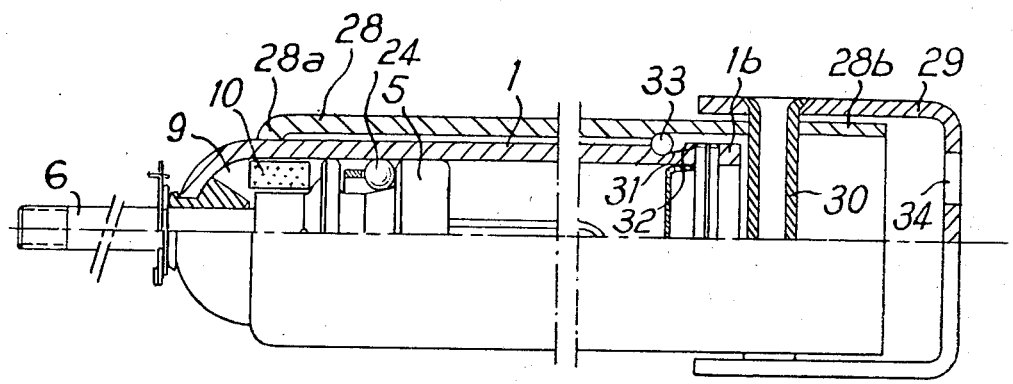
FIG. 3 is an elevational view partly in cross-section of a second embodiment of a safety belt tensioning device.

According to the embodiment represented in FIG. 3, a second stage damping is provided for and allows a damping path greater than the restraining path of the rod for fixing the safety belt, during the first phase of operation.

A telescopic combination is mounted outside the cylindrical component 1 of the tensioning device of FIG. 1; this telescopic combination consists of a cylindrical tube 28, of diameter and length greater than those of the cylinder 1, one of the ends 28a of this tube being narrowed down and being guided on the cylinder 1. The other end 28b of tube 28 is open, and comprises a U-shaped attachment clamp 29 mounted so as to pivot about a hollow tube 30 crimped on the end 28b.

A circumferential groove comprising a conical portion 31 is provided in the external wall of the component 1, near its open end 1b. Nickel-chrome steel balls 33 are placed inside this groove and rest on the internal wall of the telescopic tube 28.

In use, the free end of the rod 6 of the tensioning device is firmly fixed to the attachment buckle of the safety belt, and the U-clamp 29 is fixed, for example, to the floor of the passenger compartment of the vehicle by means of screws extending through holes 34 provided in this U-clamp.

At the end of the damping stage described above with reference to FIG. 1, a second stage of damping begins, during which the resisting force exerted on the safety belt by the passenger to be protected causes the component 1 of the tensioning device to be drawn out of the external tube 28. During this movement, the balls 33 are jammed by the conical portion 31 and penetrate into the internal wall of the said external tube 28 until they come into contact with a stop 32 formed by a side wall of the groove. From this moment onwards, they outwardly deform the wall of the tube 28, hollowing out grooves therein in order to produce a damping effect with a constant resistance fixed, for example, at 750 kgf by the use of six balls of diameter 4.5 mm and a depression of 0.2 mm.

Figure 4:
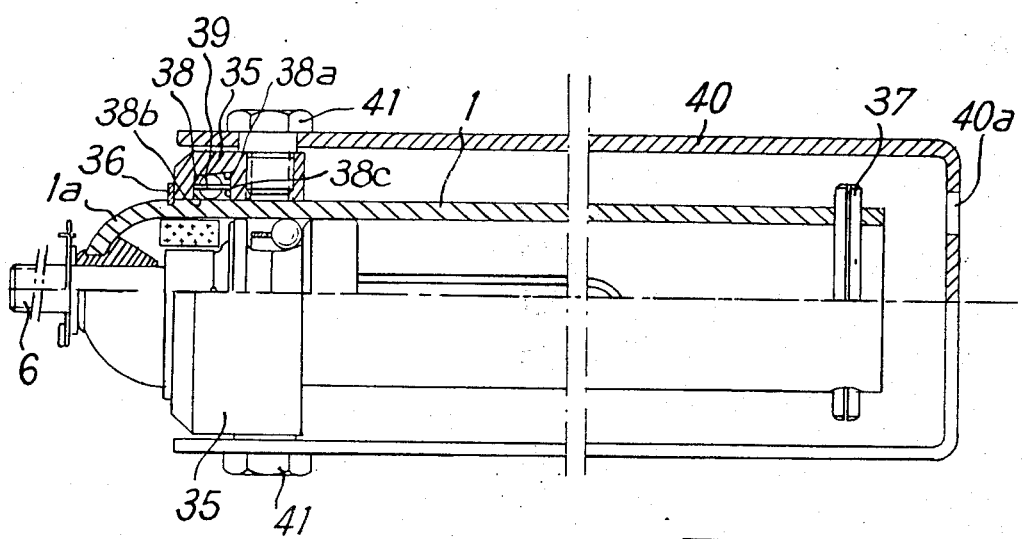
FIG. 4 is a view shown partly in cross-section of a third tensioning device embodying the invention.

According to the embodiment illustrated in FIG. 4, a telescopic combination comprises a ring 35 mounted around the end 1a of the cylindrical component 1 of the tensioning device, between two stops 36 and 37 provided at both ends of the component.

The ring 35 possesses an internal annular groove 38, the bottom 38a of which is equipped with a conical bearing surface limited between two path end stops 38b and 38c formed by the side walls of the groove. A circle of nickel-chrome steel balls 39 is located within the groove 38, and a U-clamp 40 is mounted, by means of screws 41, so as to pivot on the ring 35.

In use, the piston rod 6 is firmly fixed to the attachment buckle of the safety belt whilst the U-clamp 40 is fixed, for example, to the floor of the passenger compartment of the vehicle by means of screws screwed into the holes 40a provided on the said U-clamp.

At the end of the damping action described above in connection with FIG. 1 or 2, the force exerted on the safety belt by the person to be protected causes the cylindrical component 1 to travel backwards, to the left as seen in FIG. 4. During this movement, the balls 39 are jammed by the conical bearing surface 38a, then depressed into the material of which the external wall of the component 1 is made, and thereafter carried along from one end of the component to the other, inwardly deforming grooves therein and producing a damping effect with a constant resistance fixed, for example, at 450–500 kgf or more.

According to the embodiment represented in FIG. 5, the safety belt tensioning device comprises a cylindrical tubular component 42 closed at one of its ends 42a by a detachable base 43, and open at the other end 42b on to which a ring 44, equipped with radial fins 44a, is screwed.

Figure 5A:
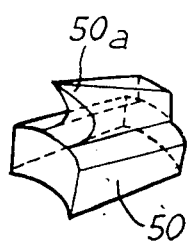
FIG. 5a is a perspective view of a penetration element represented in FIG. 5.

An ejectable annular piston 45 is mounted so as to slide inside the component 42, this piston being equipped with a seal 45a and clamped against a shoulder 46a of a mechanism head 46 by a disc with retaining lugs 47. The mechanism head includes a conical bearing surface 48, ending in a path limiting stop 49 formed by shoulder 46a. A circular row of conical ring segments 50 is mounted around this conical bearing surface, the conical ring segments having the same conicity as the bearing surface and being equipped on their external faces with sharpened points 50a (FIG. 5a).

This circle of conical ring segments acts between the path limiting stop 49 and a disc 51, an elastic O-ring seal 52 being inserted between the disc and the circle of segments.

The mechanism head 46 is fixed at the end of a rod 53 which passes through an axial passage orifice 54 in the base 43, a seal 55 being disposed between the rod and base.

Between the base 43 and the mechanism head 46, there is positioned a pyrotechnic charge 56 with a firing device consisting of two micro-ignition devices 57 connected by conducting wires 58 which extend through a channel 59 pierced in the base 43, to a firing control device, such as an impact detector.

Outside the component 42, there is mounted a telescopic combination which comprises a cylindrical tube 60, the end of which, on the side of the piston rod 53, has a small internal flange 60a equipped with a seal 61, and which is guided on the component 42. The other end of the tube 60 is closed by a base 62. Consequently, the gases produced by the combustion of the pyrotechnic charge are kept inside the tube 60.

In operation, the force exerted on the passenger to be protected is limited by the ejection of the annular piston 45, normally retained by the disc with lugs 47, as soon as the internal pressure exceeds a predetermined value.

Damping during reverse movement of the piston is effected in two successive stages: the first stage corresponds to the movement of the piston rod 53 and the mechanism head 46 through the cylinder 42, with shavings being torn off and grooves being gouged out from the internal wall of the cylinder by points 50a of the conical ring sectors 50; and the second stage corresponds to the movement of the component 42 through the external tube 60 with grooves being formed in the internal wall of the tube by the fins 44a, the radial height of which is greater, by a predetermined amount than the clearance provided between the component 42 and the external tube 60.

Figure 6:
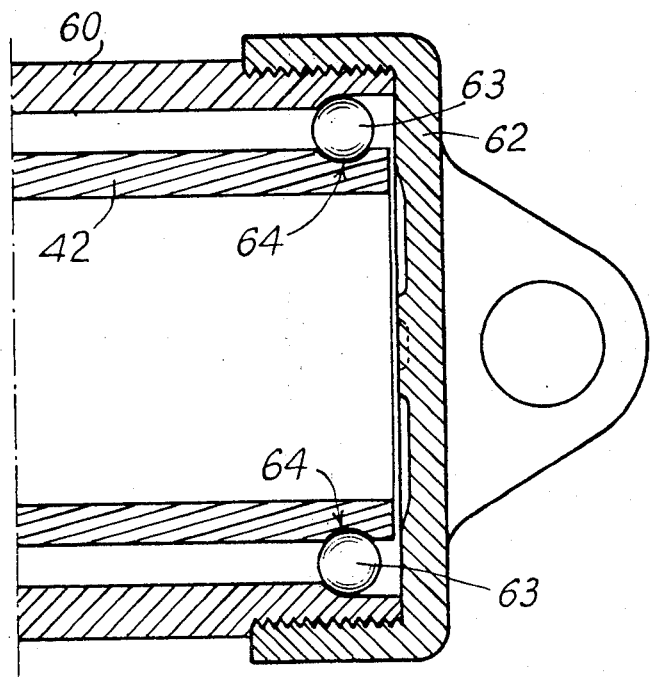
FIG. 6 is a partial view of a variant of the FIG. 5 embodiment.

The radial fins 44a could be replaced by balls 63 disposed in a circumferential groove or in hemispherical depressions 64 in the external wall of the component 42, as illustrated in FIG. 6. Also, the external tube 60 could be replaced by a conical tube or, in general terms, by a tube shaped as a surface of revolution and having a variable internal diameter so that damping is effected by exerting a force of predetermined intensity which varies according to the shape of the internal generatrix of the surface of revolution.

We claim:

1. A pyrotechnic tensioning device for use with a safety belt, comprising damping means comprising a cylinder having opposed ends, a piston slidably mounted within said cylinder, said cylinder and said piston having cooperating inner and outer surfaces, respectively, bottom and opposed side wall means defining an annular groove in the cooperating surface of one of said cylinder and said piston, said groove bottom wall having a conical bearing surface ending in one of said groove side walls which forms a path limiting stop, a circular row of elements located within the said groove, and having a radial dimension which is greater, by a predetermined amount, than the depth of the said groove adjacent the path limiting stop, whereby, in use, movement of the said piston relative to said cylinder in one direction of relative movement, is damped in a controlled manner by the said elements deforming or penetrating the said cooperating surface of the cylinder, said device further comprising a rod secured to said piston and projecting from one said end of said cylinder; a pyrotechnic charge positioned adjacent the said piston, and surrounding the said rod, so that firing of the said charge causes the piston to move in a first direction relative to the said cylinder; firing means for firing said pyrotechnic charge from externally of the said cylinder; and wherein the said damping means is arranged to damp movement of the piston relative to the cylinder in a direction opposite the said first direction, the said groove being located in the surface of the piston.

2. A pyrotechnic tensioning device according to claim 1, wherein the said damping means includes a tubular member shaped as a surface of revolution and telescoped over the cylinder, a circular row of additional elements being provided in the said cylinder and the said tubular member, at the end of the cylinder opposite the said end through which the piston rod projects, the said additional elements having a radial dimension which is greater, by a predetermined amount, than the radial distance between the said tubular member and cylinder.

3. A pyrotechnic tensioning device according to claim 1, wherein the said damping means includes a ring having an inner surface surrounding the said end of the cylinder through which the piston rod projects, a circular row of additional elements is provided in the said inner surface of the said ring, the said additional elements having a radial dimension which is greater, by a predetermined amount, than the radial distance between the said ring and cylinder.

4. A pyrotechnic tensioning device according to claim 2, further comprising bottom and side wall means defining a circumferential groove in the external surface of the said cylinder, the said bottom wall of this groove including a conical bearing surface ending in one said side wall which forms a path limiting stop, said additional elements being disposed within said groove and having a radial dimension which is greater, by a predetermined amount, than the depth of the said groove adjacent said path limiting stop.

5. A pyrotechnic tensioning device according to claim 3, wherein bottom and side wall means define an annular groove in said inner surface of said ring, said bottom wall of the groove including a conical bearing surface ending in one said side wall which forms a path limiting stop, said additional elements being disposed within said groove and having a radial dimension which is greater, by a predetermined amount, than the depth of said groove adjacent the said path limiting stop.

6. A pyrotechnic tensioning device according to claim 1, wherein said elements are balls made of a very strong material, the controlled damping being effected by deforming and rolling out grooves in the wall of the cylinder, with the said balls.

7. A pyrotechnic tensioning device according to claim 1, wherein the said elements are conical ring segments having penetration means on their external faces made of a very strong material.

8. A pyrotechnic tensioning device according to claim 7, wherein the penetration means are cutting devices so arranged that the controlled damping is effected by gouging grooves in the surface of the said cylinder, with the said cutting devices.

9. A pyrotechnic tensioning device according to claim 2, wherein a U-shaped attachment clamp is pivotally mounted on the said tubular member.

10. A pyrotechnic tensioning device according to claim 3, wherein a U-shaped attachment clamp is pivotally mounted on the said ring.

11. A pyrotechnic tensioning device according to claim 2, wherein a base closes the said tubular member at the end thereof opposite the said end through which the piston rod projects and a seal is provided at the other end of the tubular member so that gases produced by the combustion of the pyrotechnic charge are retained inside the said tubular member.

12. A pyrotechnic tensioning device according to claim 2, wherein the tubular member has a variable internal diameter, and is so arranged that the controlled damping is effected by exerting a force of predetermined intensity opposing the relative movement, and which varies according to the shape of the internal generatrix of the tubular member.

13. A pyrotechnic tensioning device according to claim 2, wherein the said additional elements are radial fins provided on the external surface of the said cylinder.

14. A pyrotechnic tensioning device according to claim 2, wherein the said additional elements consist of balls located in a circular groove means or in hemispherical depression means provided in the external surface of the cylinder.

15. A pyrotechnic device according to claim 1 including means for limiting the tensile force exerted by the piston rod on a safety belt to which it is attached.

16. A pyrotechnic tensioning device according to claim 15, wherein the said device for limiting the tensile force comprises an ejectable plug and a frangible flange normally retaining the plug in position and arranged to fracture when the internal pressure exceeds a predetermined value, the said piston having a bore with an outlet normally sealed by the plug, and the bore connecting the said combustion chamber on one side of the piston with the space on the opposite side of the said piston when the plug is ejected.

17. A pyrotechnic tensioning device according to claim 15, wherein the device for limiting the tensile force comprises an ejectable annular piston and a retaining disc which normally retains the annular piston in position and is arranged to fracture when the internal pressure exceeds a predetermined value.

* * * * *